United States Patent Office 3,626,699
Patented Dec. 14, 1971

3,626,699
GROUTING OF SOILS
William Arthur Lees, Chandlers Ford, England, assignor to Borden, Inc., New York, N.Y.
No Drawing. Filed Jan. 5, 1970, Ser. No. 831
Int. Cl. E02d 3/12, 3/14
U.S. Cl. 61—36 R                1 Claim

ABSTRACT OF THE DISCLOSURE

The present invention relates to a method for the stabilization of soil which comprises impregnating the soil with an aqueous silica acid hydrosol optionally containing a gelation accelerator.

BACKGROUND OF THE INVENTION

This invention relates to a process for the stabilization of soil by treating it, particularly by injection, with an inorganic substance capable of forming a gel which, in conjunction with the soil, hardens to form a substantially coherent and impervious mass.

The consolidation of loose soils and subsoils by mixing them with, or injecting into them, substances having a binding action is of great importance in many civil engineering mining and drilling operations. There is, therefore, a demand for compositions which may be injected into porous ground so as to render it impervious or substantially reduce its permeability. Such compositions will generally require to be low viscosity liquids which can be readily prepared on site, easily handled without hazard to the work people involved in their use, and capable of precise control within a range of properties to meet the requirements of varying site conditions.

In British patent specification No. 1,122,308, a method is described and claimed for the stabilization of soil which comprises treating the soil with an aqueous liquid composition comprising (a) a vegetable tannin extract, (b) formaldehyde and/or paraformaldehyde or a water-soluble phenol-formaldehyde resole and (c) an alkali-metal hydroxide and allowing the treated soil to harden.

Further, in the British patent specification No. 1,183,838 a method is described for the stabilization of soil which comprises treating the soil with a composition comprising (a) a vegetable tannin, (b) formaldehyde or paraformaldehyde and (c) an alkali metal carbonate or borate.

Still further, in British Pat. No. 918,641, there is disclosed a method for stabilizing soils which consists in injecting a mixture of an aldehyde and a substituted phenol.

These several methods, while effective for the purposes intended, nevertheless have a number of disadvantages in practical application. Thus, for example, mention may be made of the irritating nature of formaldehyde vapor, which may be troublesome during mixing and injection, and the caustic effect of the alkalies employed. In addition, the foregoing products are organic and, in consequence, are less resistant to ageing and other influences than inorganic materials.

It has been proposed to employ sodium silicate dispersions as inorganic grouts but such products have not proved entirely satisfactory. Thus, attempts have been made to consolidate subsoils by injecting separately solutions of sodium silicate and of acidic materials but considerable difficulty was encountered in obtaining adequate mingling of the two components and in regulating the setting time. In consequence, single solution grouts have been suggested, for example in "Artificial Consolildation of Soils" by C. B. Vaisfel'd, Handbook 39 of the U.S.S.R. Academy of Building and Architecture. In these, a colloidal solution of sodium silicate is adjusted to a predetermined pH by means of an acidic composition prior to injection into the subsoil.

In practice, however, such compositions, while generally adequate for injection into highly porous substrates, such as sands and gravels, are found to be unsatisfactory for injection into finely pored substrates since sodium silicate does not form a true solution in water but exists as a colloidal solution containing sub-colloidal aggregates. Such aggregates are of a size sufficient in many cases to block the pores of a finely pored stratum and lead in consequence to inadequate penetration. In addition, the reaction between the acidic curing agent employed and the sodium silicate cannot, in many instances, be adequately accelerated, without causing flocculation.

DESCRIPTION OF THE INVENTION

We have now found that inorganic grouts which avoid the above-mentioned disadvantages of sodium silicate grouts may be prepared by employing, in place of a mixture of sodium silicate and an acidic material, an aqueous silica sol, i.e., a silicic acid hydrosol, optionally in conjunction with a gelation accelerator. In this way a grouting composition may be obtained which has a considerably lower viscosity at a given solids content than a corresponding sodium silicate solution and may, in consequence, be injected more readily into strata of low porosity, is free from aggregates and, in addition, can be readily adjusted by the addition of suitable salts so as to form a firm gel in almost any desired time without flocculation.

Accordingly, the present invention provides a method for the stabilization of soil which comprises impregnating the soil with an aqueous silica sol, optionally containing a gelation accelerator, and causing the sol to gel therein.

The term "soil" is used herein to mean any geological matter having sufficient porosity to permit of impregnation by the method of the present invention. The invention, however, has particular utility in the treatment of subterranean strata of finely porous structure, such as sandstone, by injection under pressure.

The silica sols employed in practising the present invention are silicic acid hydrosols, which are articles of commerce and may be prepared in any of the known ways. They are normally prepared by acidifying an alkali metal silicate, commonly sodium silicate, and preventing polymerization of the resultant silicic acid beyond the desired point (about 250 A.) by adding a hydrogen bond donor which is usually an ether with an additional oxygen or nitrogen atom, or an N-substituted amide. An inorganic salt may be used to salt out the product. Alternatively the hydrosol may be purified by an ion-exchange process, optionally continuously in a counter-current ion exchanger, or by dialysis or electrodialysis. Typically, an aqueous silica sol has a $SiO_2:M_2O$ weight ratio of between 80:1 and 150:1 (where M is an alkali metal). The concentration can vary from about 10 percent to about 50 percent by weight of silica and is preferably between 20 percent and 40 percent by weight. It will be readily understood that, while silica sols having a silica content below 10 percent may be prepared, the resultant gel will be weak and of little utility for the purpose of the present invention.

In the preferred embodiment of the invention the gelation accelerator is water-soluble metal salt, which is added to the silica sol immediately prior to injection into the stratum to be grouted. Any convenient water-soluble metal salt, such as alkali metal salts, typically sodium chloride or alkaline earth metal salts typically calcium chloride, or any water soluble salts of divalent or multivalent metals for example ferrous sulphate or aluminium sulphate may be used for this purpose and will be selected to give the desired gel time. Thus, the effect of the salt will depend, inter alia, upon the magnitude of the charge on the cation and upon the amount used, the gel time being shortened most markedly by metal ions carrying multiple charges and by increasing the quantity of salt added. Thus, a silica sol of 30 percent silica content will gel in about 5 minutes after mixing with 40 percent of its volume of a 10 percent solution of sodium chloride while the same sol will remain liquid for several hours before gelling when mixed with 20 percent of its volume of a 5 percent solution of sodium chloride.

If desired, gelation may be initiated by adding materials other than metallic salts such as, for example, an alcohol, ketone, ether or carboxylic acid, or any other class of materials known to reduce the stability of a silica sol.

The following examples illustrate the invention:

EXAMPLE 1

100 parts by volume of Syton 2X (a silicic acid hydrosol produced by the Monsanto Chemical Company and characterized by having a weight average particle size of 250 A. and a $SiO_2$ content of 30 percent by weight), was stirred rapidly during the addition of 20 parts by volume of a 5 percent by weight solution of sodium chloride. After 2 to 3 days, it was found that the hydrosol had percolated through the sand, thoroughly wetting it prior to its subsequent gelation.

The said filled gel so produced was subjected to a permeability test. It was found that the K value was less than $10^{-9}$ cm. sec.

Example 2

Syton 2X and a 10 percent solution of sodium chloride were mixed in a mix metering pump in the ratio of 5:1 before being injected at a pressure of 20 pounds per square inch into a bed of gravel through which there was a slow groundwater movement. One hour after injection the water movement had ceased and upon excavation, the gravel was found to have been lightly bound into a gelatinous and impermeable mass.

In the claim:

1. A method for the stabilization of soil which comprises impregnating a soil with an aqueous silica sol having from 10% to 50% by weight silica, the aqueous silica sol being formed from an alkali metal silicate having a $SiO_2:M_2O$ weight ratio of between 80:1 and 150:1, wherein M is an alkali metal, and causing the sol to gel therein.

References Cited

UNITED STATES PATENTS

| | | | |
|---|---|---|---|
| 2,081,541 | 8/1936 | Joosten | 61—36 R |
| 2,236,147 | 3/1941 | Lerch et al. | 61—36 R X |
| 2,281,810 | 5/1942 | Stone et al | 166—293 X |
| 2,330,145 | 9/1943 | Reimers | 166—292 |
| 3,375,872 | 4/1968 | McLaughlin et al. | 166—293 X |
| 3,464,494 | 9/1969 | McLaughlin | 166—292 |
| 3,500,928 | 3/1970 | Rockwell | 166—292 |
| 3,515,216 | 6/1970 | Gies | 166—292 X |

STEPHEN J. NOVOSAD, Primary Examiner